US008802262B2

(12) United States Patent
Ahn

(10) Patent No.: US 8,802,262 B2
(45) Date of Patent: Aug. 12, 2014

(54) SECONDARY BATTERY

(75) Inventor: Chang-Bum Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 340 days.

(21) Appl. No.: 12/967,003

(22) Filed: Dec. 13, 2010

(65) Prior Publication Data

US 2011/0143178 A1 Jun. 16, 2011

(30) Foreign Application Priority Data

Dec. 15, 2009 (KR) ........................ 10-2009-0124698

(51) Int. Cl.
| H01M 4/00 | (2006.01) |
| H01M 2/00 | (2006.01) |
| H01M 2/02 | (2006.01) |
| H01M 2/08 | (2006.01) |

(52) U.S. Cl.
USPC ............. 429/94; 429/163; 429/164; 429/174; 429/185

(58) Field of Classification Search
USPC .............. 429/94, 163, 164, 174, 185
See application file for complete search history.

(56) References Cited

U.S. PATENT DOCUMENTS

| 5,969,242 A * | 10/1999 | Hubbell et al. ............ 73/152.51 |
| 2006/0263684 A1 | 11/2006 | Song |
| 2008/0254343 A1 * | 10/2008 | Kaplin et al. .................. 429/53 |
| 2010/0136427 A1 * | 6/2010 | Kondo et al. ................. 429/207 |

FOREIGN PATENT DOCUMENTS

| JP | 2006-310314 | 11/2006 |
| KR | 10-2001-0045556 A | 6/2001 |
| KR | 10-2007-0071235 A | 7/2007 |
| KR | 10-2007-0101444 | 10/2007 |
| KR | 10-2008-0057629 | 6/2008 |

OTHER PUBLICATIONS

KIPO Notice of Allowance for Korean priority Patent Application No. 10-2009-0124698, dated Apr. 18, 2011, 2 pages.

* cited by examiner

*Primary Examiner* — Karie O'Neill Apicella
(74) *Attorney, Agent, or Firm* — Christie, Parker & Hale, LLP

(57) ABSTRACT

A secondary battery including: a wound electrode assembly, including, a first electrode tab and a second electrode tab; a can to house the electrode assembly and an electrolyte, having a threaded neck and an opening; and a threaded cap to seal the can by mating with the neck. The neck may have an external threaded surface, and the cap may have an internal threaded surface that mates with the threaded surface of the neck. A sealing material may applied between the neck and the cap, to adhere the same.

20 Claims, 4 Drawing Sheets ary battery.
2. Description of the Related Art
As the miniaturization of portable electronic devices has progressed, much research has been conducted to develop secondary batteries for such portable electronic devices.

Unlike batteries that are not rechargeable, secondary batteries are rechargeable and are widely used in portable electronic devices, such as cellular phones, notebook computers and camcorders. Particularly, lithium secondary batteries have an operating voltage of 3.6 V, which is three times higher than that of nickel-cadmium batteries or nickel-hydride batteries. Lithium secondary batteries have an excellent energy density per unit weight, and therefore, the use of the lithium secondary batteries has rapidly increased.

In such lithium secondary batteries, a lithium-based oxide is used as a positive electrode active material, and a carbon material is used as a negative electrode active material. Lithium secondary batteries are manufactured in various types, such as a cylindrical, prismatic, and pouch-type.

A cylindrical type secondary battery includes an electrode assembly, a cylindrical type can, a cap assembly, a gasket, and the like. As disclosed in Korean Patent Laid-Open Publication No. 10-2007-0071235, and the like, a general cap assembly includes many components, such as a safety vent, a current blocking unit, a secondary protection device, and a cap-up. Therefore, manufacturing costs are increased and manufacturing efficiency is reduced.

SUMMARY

Additional aspects and/or advantages of the present disclosure will be set forth in part in the description that follows and, in part, will be obvious from the description, or may be learned by practice of the present disclosure.

In one exemplary embodiment, there is provided a secondary battery having a simplified structure ensuring stability.

According to an aspect of the present disclosure, there is provided a secondary battery including: an electrode assembly including a first electrode, a second electrode, and a separator interposed therebetween, which are wound together; first and second electrode tabs respectively attached to the first and second electrodes; a cylindrical can accommodating the electrode assembly and an electrolyte, having an opening and a threaded neck; a threaded cap screw-connected to the neck; and a sealing material adhering the neck to the cap.

According to various embodiments, the secondary battery may further include an elastic body positioned between the electrode assembly and the cap, to maintain the spacing therebetween.

According to various embodiments, the elastic body may be a metal spring that surrounds the first electrode tab and/or a heat-resistance sponge that is filled in a space between the electrode assembly and the cap, having an opening through which the first electrode tab passes. The electrolyte may be absorbed in the heat-resistance sponge.

According to various embodiments, the secondary battery may further include a contact plate positioned between the electrode assembly and the cap, to electrically connect the first electrode tab and the cap. The secondary battery may further include an elastic body disposed around the first electrode tab, to maintain the spacing between the electrode assembly and the contact plate. The contact plate may be welded between the first electrode tab and the cap, to electrically connect the same.

According to various embodiments, the cylindrical can may have a projection that contacts the second electrode tab, to electrically connect the second electrode tab to the cylindrical can. The projection may be formed on a bottom surface of the cylindrical can. The projection and the second electrode tab may be electrically connected to each other through welding.

According to various embodiments, the sealing material may be coated on the outer surface of the neck or the inner surface of the cap and then heat fused, to adhere the cap to the neck.

According to various embodiments, the sealing material may include a polypropylene-based material.

In a secondary battery according to an exemplary embodiment, a cylindrical can and a cap are screw-connected to each other and adhered together with a sealing material, so that it is possible to employ a simplified structure having only a small number of components and to secure the stability of the connection.

According to various embodiments, when an elastic body such as a metal spring or heat-resistance sponge is provided between an electrode assembly and a cap, it is possible to stably support the electrode assembly and maintain the spacing between the electrode assembly and the cap.

According to various embodiments, an electrolyte is absorbed in the heat-resistance sponge, such that the stored electrolyte can be used to replenish the electrolyte stored in the can, thereby extending the lifetime of the secondary battery.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which.

DETAILED DESCRIPTION OF THE EMBODIMENTS

Figure 1:
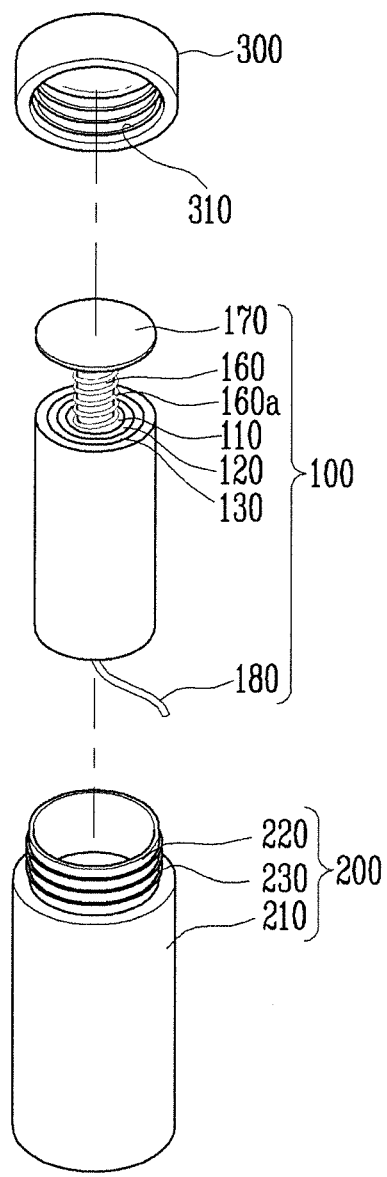
FIG. 1 is an exploded perspective view of a secondary battery, according to an exemplary embodiment of the present disclosure.

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

As those skilled in the art would realize, the described exemplary embodiments may be modified in various different ways, all without departing from the spirit or scope of the present disclosure. Accordingly, the drawings and description are to be regarded as illustrative in nature and not restrictive. Herein, when a first element is referred to as being formed or disposed "on" a second element, the first element can be disposed directly on the second element, or one or more other elements may be disposed therebetween. When a first element is referred to as being formed or disposed "directly on" a second element, no other elements are disposed therebetween. Also, when an element is referred to as being "connected to" another element, it can be directly connected to the other element or be indirectly connected to the other element, with one or more intervening elements interposed therebetween.

Figure 2:
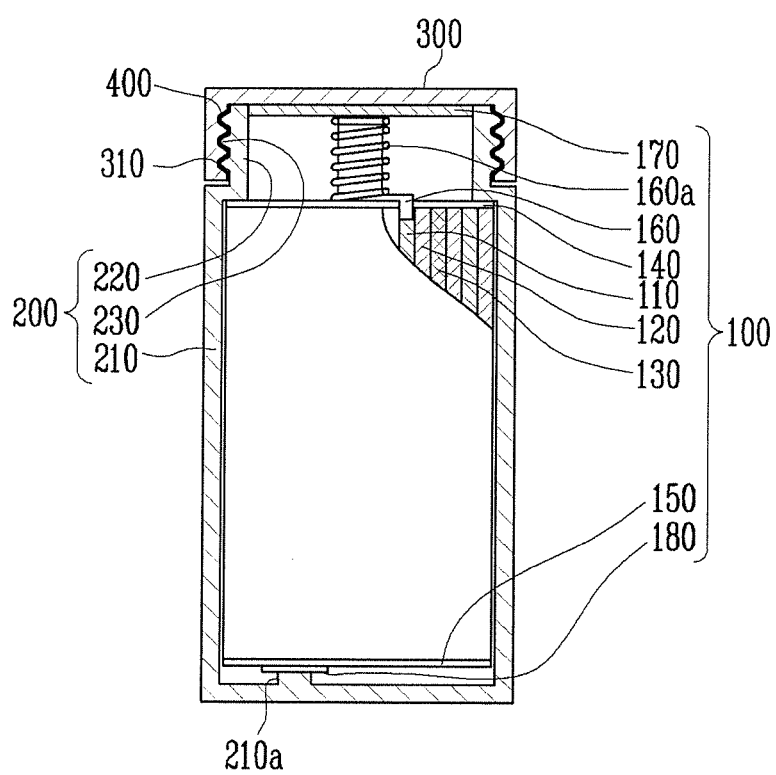
FIG. 2 is an assembled sectional view of the secondary battery illustrated in FIG. 1.

FIG. 1 is an exploded perspective view of a secondary battery, according to an exemplary embodiment of the present disclosure. FIG. 2 is an assembled sectional view of the secondary battery illustrated in FIG. 1.

Referring to FIGS. 1 and 2, the secondary battery includes an electrode assembly 100; a cylindrical can 200 to house the electrode assembly 100 and an electrolyte; and a cap 300 sealing the cylindrical can 200. Particularly, the cylindrical can 200 and the cap 300 are screwed together.

The electrode assembly 100 is in the form of a jelly-roll, which is formed by winding a first electrode 110, a second electrode 130, and a separator 120 interposed therebetween. The electrode assembly 100 also includes first and second electrode tabs 160 and 180 that respectively extend from opposing ends from the jelly roll. Here, first and second electrodes 110 and 130 have different polarities. For example, if the first electrode 110 is a positive electrode, the second electrode 130 is a negative electrode. In this case, the first electrode tab 160 may be a positive electrode tab, and the second electrode tab 180 may be a negative electrode tab.

As illustrated in FIG. 2, the electrode assembly 100 may further include upper and lower insulation plates 140 and 150 securing electrical stability between the electrode assembly 100 and the cap 300 and/or cylindrical can 200. In this case, openings through which the first and second electrode tabs 160 and 180 pass may be formed in the upper and lower insulation plates 140 and 150, respectively.

The electrode assembly 100 may further include a contact plate 170 positioned between the first electrode tab 160 and the cap 300, to electrically connect the first electrode tab 160 and the cap 300. For convenience, the contact plate 170 has been described as a component of the electrode assembly 100. However, the contact plate 170 and the electrode assembly 100 may be considered as separate components. In addition, the electrode tabs 160 and 180 may be considered as separate components from the electrode assembly 100.

The electrode assembly 100 may further include an elastic body 160a positioned between the electrodes 110 and 130, and the contact plate 170. The elastic body 160a applies pressure to the electrode assembly 100, so that the electrode assembly 100 is stably supported and spaced apart from the contact plate 170. The elastic body 160a may be a metal spring 160a that surrounds the first electrode tab 160.

The elastic body 160a may be formed of a metal having relatively strong corrosion resistance, such as aluminum, nickel, or alloy thereof. However, the elastic body 160a is not limited to a spring formed of a metallic material. In particular, the elastic body 160a may be implemented using various materials having elasticity and suitable corrosion resistance.

The cylindrical can 200 accommodates the electrode assembly 100 and the electrolyte, and includes a body 210, a neck, and an opening. Here, the diameter of the neck is smaller than that of the body 210.

The cylindrical can 200 is generally formed of aluminum, iron, or alloy thereof. As illustrated in FIG. 2, the bottom surface of the cylindrical can 200 includes a projection 210a that contacts the second electrode tab 180, so that the projection 210a itself serves as a negative electrode. A first screw thread 230 is formed on the outer surface of the neck 220.

The secondary battery is not limited to having the cylindrical can 200. That is, the shape of the can 200, particularly, the shape of the body 210, may be variously modified, and the neck 220 may be formed in any shape that can be screw-connected to the cap 300. To put it another way, the shape of a can to house the electrode assembly 100 and an electrolyte is not necessary limited to the above described and shown shape.

The cap 300 is screw-connected to the neck 220, so as to be attached to (seal) the cylindrical can 200. To this end, a second screw thread 310, to be connected to the first screw thread 230, is formed on the inner surface of the cap 300.

The assembling process of the aforementioned secondary battery will now be described. After the electrode assembly 100 and the electrolyte are inserted into the cylindrical can 200 through the neck 220, the cylindrical can 200 and the cap 300 are screwed together, by rotating the cap 300 (or the cylindrical can 200) along the direction of the screw threads 230 and 310, while pressing the cap 300 toward the can 200. Thus, the interior of the cylindrical can 200 is sealed.

In order to reinforce the connection between the cylindrical can 200 and the cap 300 and effectively seal the interior of the cylindrical can 200, the cylindrical can 200 and the cap 300 may be adhered to each other with a sealing material 400, as illustrated in FIG. 2. The sealing material 400 may be an adhesive material disposed between the neck 220 and the cap 300.

The sealing material 400 may be coated on the outer surface of the neck, or the inner surface of the cap 300. Once the neck 220 and the cap 300 are screwed together, the sealing material can be heat-fused, to fuse together the neck 200 and the cap 300.

The sealing material 400 may be a polypropylene-based material or the like. In the case of the polypropylene material, when gas or heat is generated in the interior of the secondary battery, a polymer layer is melted at a higher temperature than a predetermined temperature, to release the gas. When the internal pressure of the secondary battery is increased, the connection of the cylindrical can 200 and the cap 300 is released, and the cylindrical can 200 is opened. Thus, it is possible to prevent the secondary battery from exploding. The sealing material 400 is not necessarily limited to the polypropylene-based material. That is, the sealing material 400 may be any material that can prevent the secondary battery from exploding.

The upper and lower portions of the assembled secondary battery can be welded, to secure the electrical stability thereof. For example, the upper portion of the secondary battery may be welded, so that the contact plate 170 electrically connects the first electrode tab 160, and the cap 300. That is, the contact plate 170 may be welded to the first electrode tab 160 and the cap 300. In addition, the lower portion of the secondary battery may be welded, so that the projection 210a is electrically connected to the electrode assembly 100. In particular, the projection 210a may be welded to the second electrode tab 180.

As described above, the cylindrical can 200 and the cap 300 are screwed together and are adhered to each other with the sealing material 400, so that it is possible to produce a battery having a simplified structure and a reduced number of components. Accordingly, it is possible to reduce manufacturing costs and to enhance manufacturing efficiency.

When the elastic body 160a is provided between the electrodes 110 and 130, and the cap 300, it is possible to properly space and support the electrodes 110 and 130, and the cap 300. In other words, the elastic body 160a biases the cap 300 away from the electrode assembly 100.

When gas is generated in the interior of the secondary battery, and the secondary battery reaches a predetermined temperature, the sealing material 400 melts and the gas is exhausted. In addition, when the internal pressure of the secondary battery reaches a predetermined level, the connection of the cylindrical can 200 and the cap 300 is released, and the cylindrical can 200 is opened. Thus, it is possible to prevent an explosion of the secondary battery. Accordingly, it is possible to secure the stability of the secondary battery.

Figure 3:
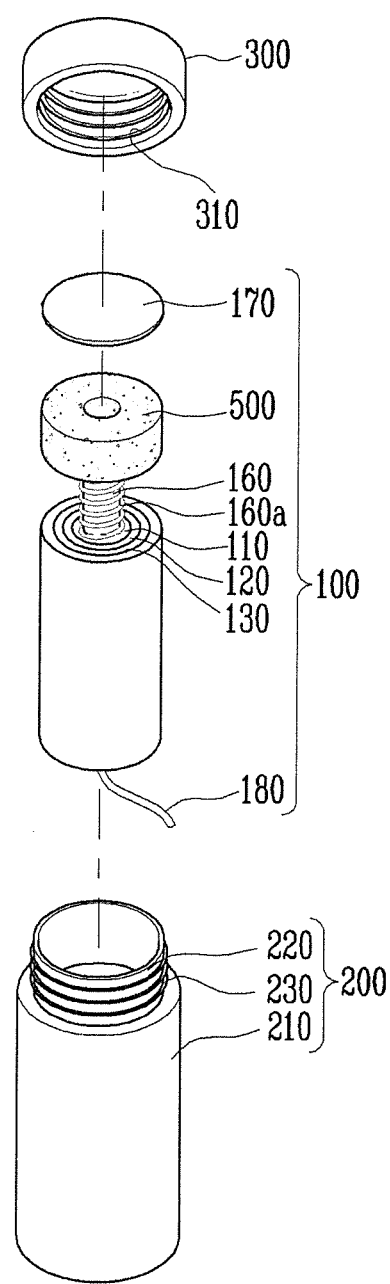
FIG. 3 is an exploded perspective view of a secondary battery, according to another exemplary embodiment of the present disclosure.
Figure 4:
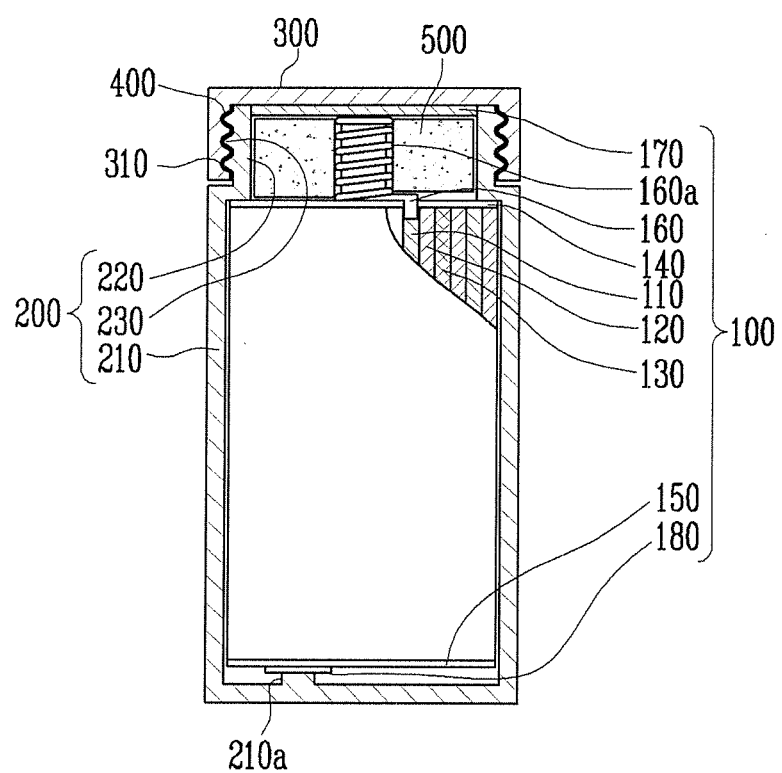
FIG. 4 is an assembled sectional view of the secondary battery illustrated in FIG. 3.

FIG. 3 is an exploded perspective view of a secondary battery, according to another exemplary embodiment of the present disclosure. FIG. 4 is an assembled sectional view of the secondary battery illustrated in FIG. 3. In FIGS. 3 and 4, similar components have the same reference numerals, and are not described in detail.

Referring to FIGS. 3 and 4, the secondary battery further includes a second elastic body 500, which may be a heat-resistant sponge. Here, heat resistant refers to having stability at normal battery operating temperatures. The second elastic body 500 is disposed between the electrodes 110 and 130, and a cap 300 and in particular, between the electrodes 110 and 130 and a contact plate 170. The second elastic body 500 has an opening through which a first electrode tab 160 and a first elastic body 160a extend.

In addition to the first elastic body 160a, the second elastic body 500 stably supports and separates an electrode assembly 100 and the contact plate 170. The first elastic body 160a and a first electrode tab 160 operate as a center pin. However, the first and second elastic bodies 160a and 500 may be used together or singularly.

The second elastic body 500 may be formed of a spongy material, such as a polypropylene-based or polyethylene-based material having excellent electrical properties and shock absorption characteristics. An electrolyte may be absorbed in the second elastic body 500. In this case, when the electrolyte is exhausted from the secondary battery, due to the long-term use or storage, the electrolyte absorbed in the second elastic body 500 can replace the exhausted electrolyte, by moving into the electrode assembly 100. Accordingly, the lifetime of the secondary battery can be extended. At this time, an upper insulation plate 140 may be removed or formed of a material through which the electrolyte can permeate.

Although a few exemplary embodiments of the present disclosure have been shown and described, it would be appreciated by those skilled in the art that changes may be made in these exemplary embodiments, without departing from the principles and spirit of the disclosure, the scope of which is defined in the claims and their equivalents. For example, the shape of a can to house an electrode assembly and an electrolyte is not necessarily limited to the above description.

What is claimed is:

1. A secondary battery comprising:
    a wound electrode assembly comprising a first electrode, a second electrode, and a separator interposed therebetween,
    first and second electrode tabs extending respectively from the first and second electrodes;
    a can to house the electrode assembly and an electrolyte, having a threaded neck;
    a threaded cap screwed to the neck; and
    a sealing material disposed between a threaded outer surface of the neck and a threaded inner surface of the cap, the threaded cap being configured with the neck to be released from the can when an internal pressure of the electrode assembly housed in the can reaches a predetermined level to open the can.

2. The secondary battery according to claim 1, further comprising an elastic body positioned between the electrode assembly and the cap, to space apart the electrode assembly and the cap.

3. The secondary battery according to claim 2, wherein the elastic body is a metal spring that surrounds the first electrode tab.

4. The secondary battery according to claim 3, wherein the metal spring is formed of aluminum, nickel, or alloy thereof.

5. The secondary battery according to claim 2, wherein the elastic body is a heat-resistance sponge disposed between the electrode assembly and the cap, having an opening through which the first electrode tab extends.

6. The secondary battery according to claim 5, wherein the electrolyte is absorbed into the heat-resistance sponge.

7. The secondary battery according to claim 5, wherein the heat-resistance sponge comprises a polypropylene-based material or a polyethylene-based material.

8. The secondary battery according to claim 1, further comprising a contact plate between and electrically connecting the first electrode tab and the cap.

9. The secondary battery according to claim 8, further comprising an elastic body disposed around the first electrode tab, to separate the electrode assembly from the contact plate, wherein the contact plate is welded to the first electrode tab and the cap.

10. The secondary battery according to claim 1, wherein the second electrode tab contacts a projection formed on the bottom of the can.

11. The secondary battery according to claim 10, wherein the projection and the second electrode tab are welded together.

12. The secondary battery according to claim 1, wherein the sealing material comprises a polypropylene-based material.

13. The secondary battery according to claim 1, further comprising:
    a first elastic body disposed around the first electrode tab, extending between the electrode assembly and the cap; and
    a second elastic body disposed around the first elastic body.

14. The secondary battery according to claim 13, wherein:
    the first elastic body comprises a spring; and
    the second elastic body comprises a heat-resistant sponge.

15. The secondary battery according to claim 14, wherein the heat-resistant sponge absorbs the electrolyte.

16. A secondary battery comprising:
    a wound electrode assembly;
    a can to house the electrode assembly, having a threaded neck;
    a threaded cap screwed onto the neck;

a sealing material disposed between a threaded outer surface of the neck and a threaded inner surface of the cap, the threaded cap being configured with the neck to be released from the can when an internal pressure of the electrode assembly housed in the can reaches a predetermined level to open the can;

a first electrode tab to electrically connect the electrode assembly to the cap; and a first elastic body disposed around the first electrode tab, to space apart the electrode assembly and the cap.

17. The secondary battery of claim 16, further comprising a second elastic body disposed around the first elastic body.

18. The secondary battery of claim 17, wherein:

the first elastic body comprises a spring;

the second elastic body comprises a heat-resistant sponge; and the sealing material comprises a polypropylene-based material.

19. The secondary battery of claim 16, further comprising a cap plate disposed between the first electrode tab and the cap.

20. A secondary battery comprising:

a wound electrode assembly comprising a first electrode, a second electrode, and a separator interposed therebetween, first and second electrode tabs extending respectively from the first and second electrodes;

a can to house the electrode assembly and an electrolyte, having a threaded neck;

a threaded cap screwed to the neck; and a sealing material disposed between a threaded outer surface of the neck and a threaded inner surface of the cap, the sealing material being adapted to melt when the secondary battery reaches a predetermined level to release the threaded cap from the can.

* * * * *